July 17, 1923.

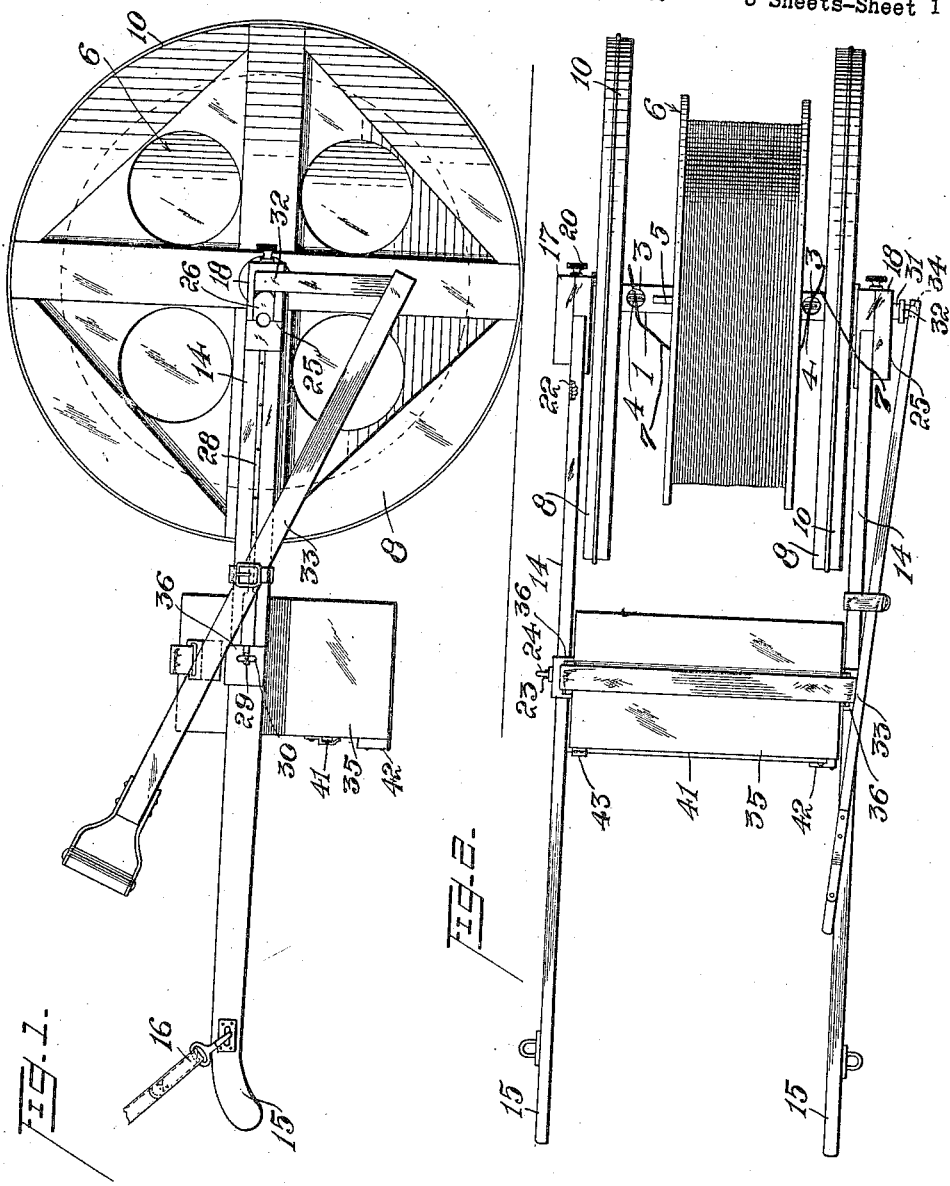

E. R. SAGER 1,461,939

WIRE CART

Filed Sept. 4, 1920

Inventor
Edgar R. Sager
By Robert H. Young
Attorney

July 17, 1923.
E. R. SAGER
WIRE CART
Filed Sept. 4, 1920
1,461,939
3 Sheets-Sheet 3
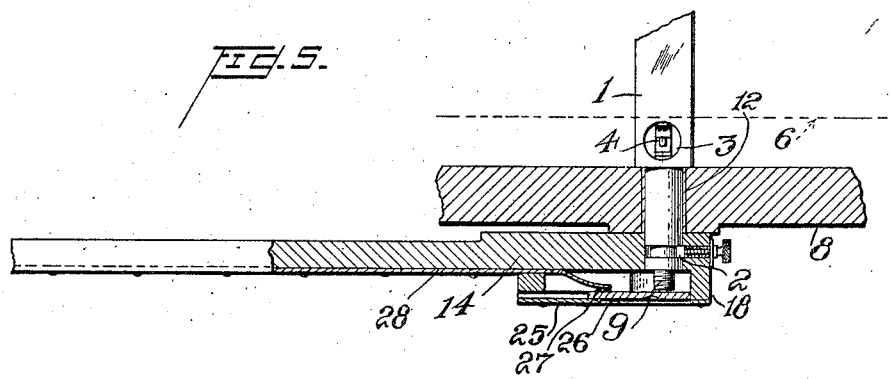
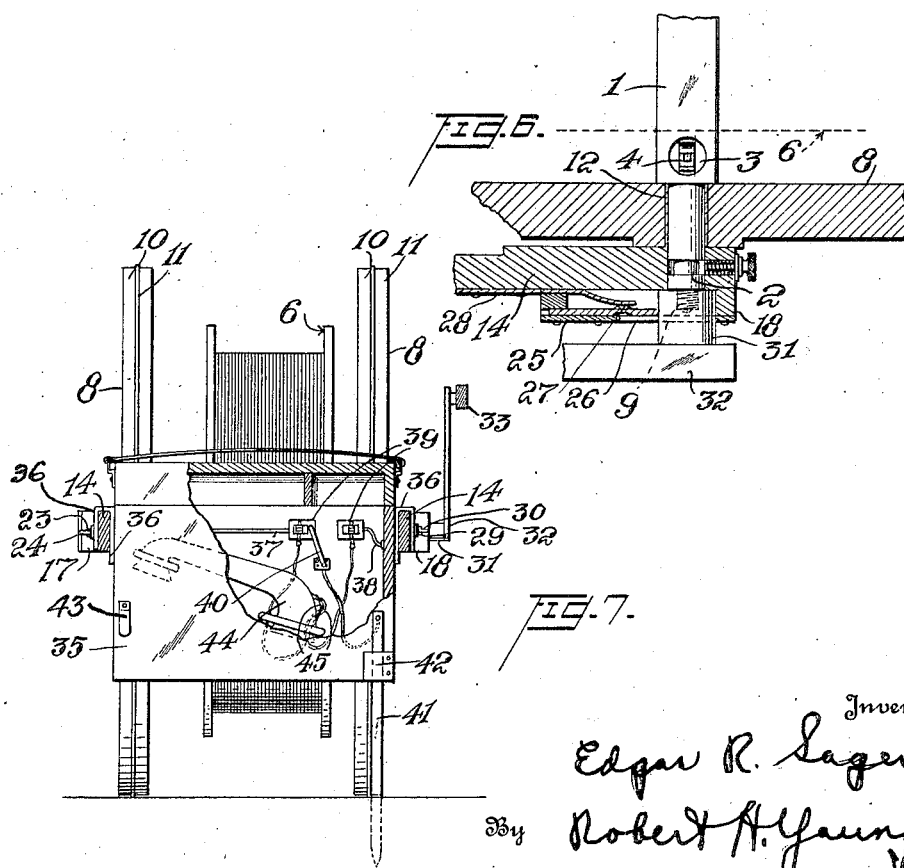
Inventor
Edgar R. Sager
By Robert H. Young,
Attorney Patented July 17, 1923.

1,461,939

UNITED STATES PATENT OFFICE.

EDGAR R. SAGER, OF THE UNITED STATES ARMY.

WIRE CART.

Application filed September 4, 1920. Serial No. 408,340.

*To all whom it may concern:*

Be it known that I, EDGAR R. SAGER, a citizen of the United States of America, and first sergeant of the Signal Corps, United States Army, residing at Washington, in the District of Columbia, have invented a certain new and useful Improvement in Wire Carts, of which the following is a specification.

This invention relates to improvements in wire carts such as employed in army field operations and it is the dominant object of the invention to provide a wire cart capable of practical use in the establishment and maintenance of telephone communication in battle areas, where, by reason of hostile fire, impassable roads, entanglements, etc., it becomes impossible for horse or motor driven vehicles to traverse such areas.

It is also an object of the invention to provide a cart of the character mentioned of such light and compact construction as will render the same capable of being propelled over uneven or other difficult areas by a single man, who may at all times, keep in communication with a rearward telephone station for receiving and carrying out commands and who also will be enabled to set up and maintain telephone communication between the station of command and a point located in a shelled position or area.

The invention is also characteristic in the provision of the cart with a novel form of axle for receiving the wheels and also, for supporting the wire reel in a manner to permit of rotation thereof and at the same time, afford means for effecting connection between the wire on said reel and the telephone apparatus located on the cart.

Other objects, advantages and improved results arising out of the particular arrangement and construction of parts of the wire cart, I will hereinafter more particularly describe.

In the drawings, wherein like characters of reference designate like or corresponding parts throughout the several views:

Figure 1 is a side elevation of the improved wire cart;

Figure 2 is a top plan view thereof;

Figure 5 is a detail partly in section showing the electrical connection between one of the cart shafts and the axle thereof;

Figure 6 is a fragmentary detail showing the crank connection with the wire reel; and Figure 7 is an end view of the cart showing the engagement of the ground connection with the ground.

Figure 3:
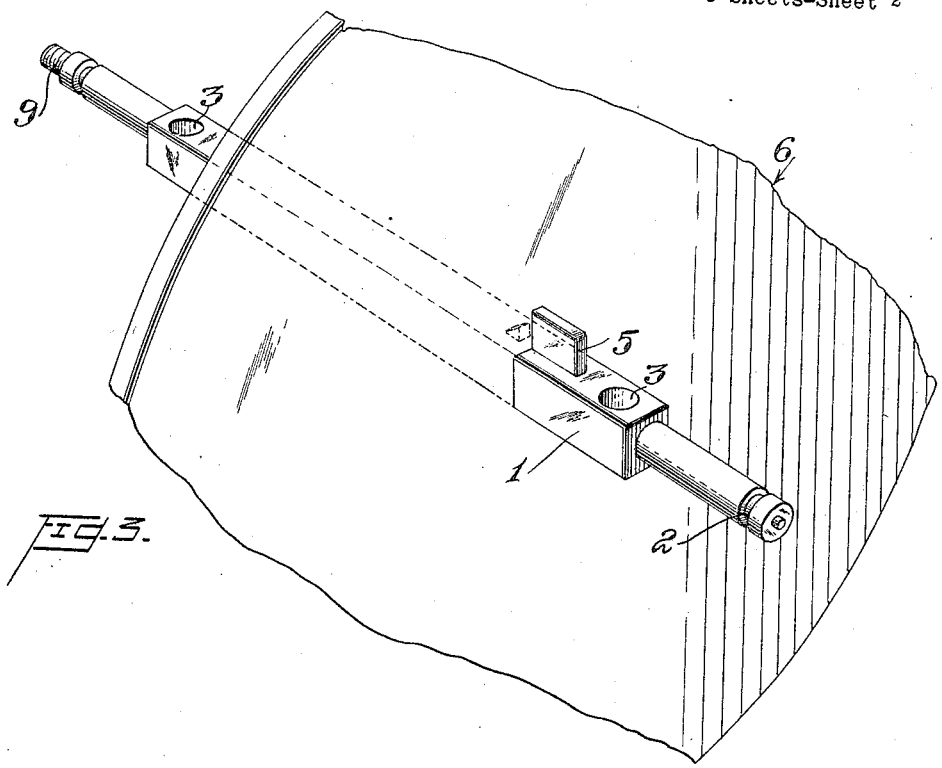
Figure 3 is a detail in perspective showing the mounting of the wire reel on the cart axle.
Figure 4:
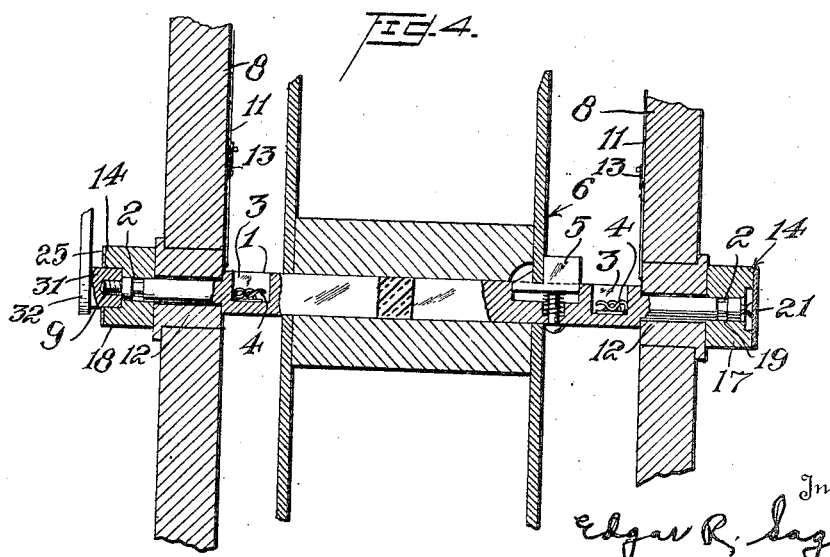
Figure 4 is a vertical transverse section through the cart.

In the embodiment of my invention selected for illustration, the improved cart comprises an axle 1 formed with the usual bearing trunnions, the outer ends of which are provided with annular grooves 2, while pockets or recesses 3 are formed in the bolster portion of the axle and have quick attachable and detachable contact connections 4 therein a spring pressed catch 5 being slidably engaged with the bolster portion of the axle and so arranged as to afford temporary connection between the axle and wire reel 6, upon which telephone wire or like material is arranged. This reel 6 is formed with a concentric squared opening of such size as to snugly receive the bolster portion of the axle 1, the catch 5 engaging in the opening in one side of the reel whereby to lock the same with relation to said axle. When a metallic circuit is employed, the innermost ends of the wire arranged on the reel 6 are bared of insulation and engaged with the connections 4, the remaining ends of the wire, of course, being connected to the telephone apparatus, hereinafter more fully described, those ends of the wire directly connected to the axle being designated by the numeral 7.

Wheels 8, preferably but not necessarily formed of wood, are mounted on the bearing trunnion portions of the axle 1, which as will be noted, has a screw threaded extension 9 formed on one of the trunnions thereof. The wheels 8 have light metallic tires 10 arranged about their tread portions, which in turn are engaged by conductors 11 embedded or otherwise arranged in the wheel and extending inwardly into engagement with the concentrically located bearing bushings 12 on the wheels, these bushings, as will be understood, receiving the bearing trunnions of the axle 1 there-through. Switches 13 may be and preferably are interposed in the conductors 11 and secured to their respective wheels 8 in a suitable manner, whereby ground connection between the axle 1 carrying the reel 6 and the metallic tires 10 may be positively controlled by either opening or closing the same.

The outer extremities of the bearing trunnion portions of the axle 1 extend beyond the outer sides of their respective wheels, exposing the annular grooves 2 therein. Over these extended bearing trunnion portions of the axle 1, I engage shafts 14, comprising lengths of suitable material having their outer ends curved as at 15 for an obvious purpose and provided with a suitable form of harness 16 adapted for arrangement over the shoulders of an operator of the cart. Connections 17 and 18 are carried on those ends of the shafts 14 engaging bearing trunnion portions of the axle, the connection 17 consisting of an enlargement on said end of its respective shaft having a bearing opening 19 formed therein into which one end of a spring pressed locking pin 20 extends, said bearing opening 19 serving to receive the extended extremity of the axle bearing trunnion, whereupon the locking pin 20 is snapped into the annular groove 2 thereon for preventing displacement of the shaft with relation to the same. A contact finger is carried on this particular extended portion of the bearing trunnion and engages with a yieldable contact plate 21 arranged in the connection 17 and having one end of a conductor 22 connected thereto, the conductor in turn, being embedded or otherwise arranged longitudinally of a portion of the shaft and having connection at its free end with a screw 23 over which a wing nut 24 is turned.

The connection 18 on the remaining shaft is quite similar to the connection 17, employing a locking pin which is engageable with the annular groove 2 in the remaining extended axle bearing trunnion whereby to prevent displacement of its respective shaft with relation thereto. However, this latter connection has a plate 25 arranged on its outer side and formed with a slot slidably receiving a closure plate 26 therein which carries on its inner face a spring rubbing contact 27. As will be noted, one end of the slot in the plate 25 aligns with the bearing opening in the connection and in consequence, when the plate 26 with its spring contact 27 is in closed position, the contact finger formed on the extended axle bearing trunnion portion engaged therein will have contact with said spring, thus completing an electrical connection through said portion of the trunnion, the connection, and through a conductor 28 embedded or otherwise arranged in its respective shaft and extending longitudinally for a portion of its length into engagement with a screw 29 having a wing nut 30 there onto engagement therewith. However, when the plate 26 has been moved to an open position, that portion of the slot aligned with the bearing opening in the connection 18 is exposed, thus exposing the screw threaded extension 9 on the axle trunnion and permitting the turning of the screw threaded sleeve 31 of a crank connection 32 into engagement therewith, this crank connection having a handle 33 pivoted thereto through the medium of an ordinary ball and socket connection 34, whereby to eliminate any possibility of lateral binding of said crank during its operation. With the crank connected in the manner outlined, it will be readily understood that means are afforded for rotating the axle 1 and in consequence, the wire reel 6 which is mounted on the squared bolster portion thereof. Hence, wire may be coiled about said reel through this means.

A field telephone equipment such as commonly used in army field operations is provided, the same being housed in a box 35 provided with the suitable hinged closure and carrying angle brackets 36 on its opposite ends formed with vertical slots adapted to be engaged over the screws 23 and 29 located on the shafts 14, the respective wing nuts 24 and 30 of said screw being then tightened upon the adjacent portions of the angle brackets to firmly secure the telephone housing box 35 in position.

Conductors 37 and 38 are arranged on the inner side of the box 35 and have certain of their ends connected through the walls of the box to said angle brackets 36, the remaining ends of these conductors extending into engagement with contact plates 39 secured to the inner face of the rear wall of the box and adapted to be optionally engaged by a pivotal circuit make and break device or arm 40 also mounted on said rear wall of the box and having connection through one side of this box with a ground rod 41 pivoted to the outer side of the front wall thereof and adapted, at times, to be swung downwardly into a substantially vertical position, a stop 42 serving to limit movement of the arm so that the same will properly engage with the ground when permitted to swing downwardly out of engagement with the spring catch 43 for the free or ground engaging end thereof. By this means, I am enabled to employ my improved cart in connection with a ground circuit, coiling but one wire on the reel 6 in this instance and permitting ground connection through the ground arm 41 and optionally through either side of the telephone housing box 35, the ground connection being continued onto either one of the wheels 8, through the conductors arranged therein and to the metallic tires 10 on the threaded portions thereof.

The telephone 44 arranged in the box 35 has the terminals 45 thereof connected to the contact plates 39 by means of quick attachable connections, thus affording means for connecting the device to the metallic circuit afforded by the double wires received about the reel 6 or to the ground circuit just described. When the telephone is used in connection with an all metallic circuit, a circuit make and break arm 40 is moved to a neutral position, thus cutting out the ground arm 41 and allowing direct connection with the opposite sides of the axle 1 which in turn has connection with the free ends of the double wires arranged on the reel.

In using my improved wire cart, and assuming that it is desired to take the same from a station of command into a battle area, the outer ends of the wires arranged about the reel 6 are engaged with the telephone apparatus of such station of command whereupon the operator propels the cart into the designated area. By reason of the fact that the opposite ends of the double wires are connected to the telephone set 44 carried on the cart, it will be understood that such operator will be constantly in connection with the station of command, irrespective of the uncoiling of the wire or the "paying out" of the same from the reel as the car proceeds in the ordered direction. Should a ground circuit be employed subsequent to arrival of the cart at the designated location, the make and break device 40 is swung over into contact with one of the plates 39, thus establishing connection with the ground arm 41 which is now swung downwardly with engagement in the ground in the manner heretofore explained. Further, it will be also understood that a ground circuit may be employed while the cart is in motion. In this instance, the ground contact arm 41 is swung upwardly to inoperative position and the current is permitted to ground through one of the metallic tires 10 on the wheels 8, such connection with the ground being positively controlled by the switches 13 provided for this purpose.

When the operator of the cart desires to return to the station of command or at least desires to approach a nearer position with relation thereto, the harness 16 is arranged on his body in proper manner and the cart is then propelled in the desired direction. During movement of the cart, the crank handle 33 is reciprocated to impart rotary motion to the reel 6 through, axle 1 carrying the same, thus causing the wire previously "paid-out" to be rewound about the reel.

It will be appreciated that my improved wire cart is of particular advantage for use in army field operations, the operation of the same requiring but one man, and in consequence, reducing liability of casualties to the minimum. Furthermore, the cart affords an exceedingly meritorious arrangement for establishing communication between a rearwardly located station of command and a forward position in battle area, where often times, the condition of the ground is such as to prevent the passage of horse and motor driven vehicles or even man-drawn vehicles of a larger design than my improved cart thereover.

The cart may be readily disassembled and because of its exceptionally simple construction, may be repaired or have parts thereof entirely replaced with but little effort.

Manifestly, the construction shown is capable of considerable modification, and such modification as is within the scope of my claims, I consider within the spirit of my invention.

I claim:

1. A cart of the character described, comprising a reel mounted on and rotatable with the cart axle, shafts engaged with the axle and electrically connected to said reel through the axle, and intelligence transmitting and receiving means supported on said shafts and electrically connected thereto.

2. A cart of the character described, comprising a reel mounted on and rotatable with the cart axle, means for imparting rotary motion to said axle and reel, shafts engaged with the opposite extremities of the axle and electrically connected to the reel through said axle, and intelligence transmitting and receiving means supported on and electrically connected to said shafts.

3. A cart of the character described, comprising a reel mounted for rotation on the cart axle, a crank detachably engaged with one end of said axle for facilitating rotation of the same, the handle of the crank being connected to the same loosely to impart of lateral movement thereof during operation, shafts engaged with the extremities of the axle and electrically connected to the reel through said axle, and intelligence transmitting and receiving means supported on and electrically connected to said shafts.

4. A cart of the character described, comprising a reel mounted for rotary movement on the cart axle, a crank detachably connected to one end of the axle, a handle having loose pivotal connection with said crank whereby to permit of lateral movement of the same during operation, and intelligence transmitting and receiving means supported on said cart and electrically connected to the axle thereof.

5. A cart of the character described, having a reel mounted for rotary movement on its axle, means detachably engageable with said axle for imparting rotary motion to the same, spaced shafts engaged with the extremities of said axle and electrically connected thereto, connections on said shafts included in the electrical connection of the same with the axle, intelligence transmitting and receiving means, a housing for said means, and brackets secured to the opposite ends of said housing engageable with said last mentioned connections and connected to said intelligence transmitting and receiving means.

6. A cart of the character described, having a wire receiving reel mounted for rotary movement on its axle, shafts connected to the opposite ends of said axle, said shafts, axle and reel being electrically interconnected, screws having wing nuts turned thereonto carried by said shafts and included in the electrical connection with said reel, and an intelligence transmitting and receiving means containing housing supported on said shafts and electrically connected to said screws.

7. A cart of the character described, comprising an axle having a squared intermediate portion formed with spaced recesses therein, quick attachable connections in said recesses, a reel mounted on and rotatable with said axle, wheels on the bearing trunnion portion of the axle, shafts engaged with the extremities of said axle, the ends of the wire on said reel being engaged with said quick attachable connection, and the axle and said shafts being electrically connected, and intelligence transmitting and receiving means supported on said shafts and electrically connected thereto.

8. A cart of the character described, comprising an axle having a squared intermediate portion formed with spaced recesses therein, quick attachable connections in the recesses, a spring pressed catch on the axle, a wire receiving reel arranged on said axle engaged by the catch and rotatable therewith, wheels mounted on the bearing trunnion portions of the axle, shafts loosely connected to the opposite extremities of the axle, the inner ends of the wire on said reel having engagement with said quick attachable connections, and the axle and said shafts being electrically interconnected, intelligence transmitting and receiving means, a housing for receiving said means, and brackets on the opposite ends of the housing engageable with said shafts and electrically connected thereto for permitting transmission of energy to the intelligence transmitting and receiving means.

9. A cart of the character described, having a reel mounted for rotary movement on its axle and electrically connected thereto, the wheels of the cart engaged with said axle also having electrical connection with the same and said reel, metallic tires on the tread portions of the wheels, circuit make and break means connected to said tires and to the points of engagement of the wheels with said axle, shafts engaged with and electrically connected to said axle, and intelligence transmitting and receiving means supported on and electrically connected to the shafts.

10. A cart of the character described, having a wire receiving reel mounted thereon for rotary motion, metallic tires on the tread portions of the wheels of said cart, electrical circuit make and break means on the wheels connected to said tires and to the axle through their respective wheels, shafts loosely engaging the extremities of the axle, intelligence transmitting and receiving means, a housing for said means supported on the shafts and electrically connected to the axle, a ground contact rod pivoted to the housing, and circuit make and break means in the housing connected to the intelligence transmitting and receiving means for optionally establishing one side of an electrical circuit through the metallic tires or the ground contact rod.

11. A cart of the character described, comprising an axle having a squared bolster portion formed with spaced recesses therein, quick attachable connections in said recesses, the extremities of the bearing trunnion portions of said axle having annular grooves formed therein, a screw threaded extension on one of said bearing trunnion portions, a spring pressed catch on the axle, a wire receiving reel mounted on and rotatable with the axle and engaged by said catch, the inner ends of the wire about said reel being engaged with the quick attachable connections, wheels on the bearing trunnion portions of the axle, metallic tires on the tread portions of said wheels, electrical circuit make and break means on the wheels connected to the tires thereof and through said wheels to the axle, shafts having bearing openings in certain of their ends rotatably engaged over the extremities of said axle, locking pins on said ends of the shafts removably engaged in the annular grooves of the bearing trunnion portions, spring pressed electrical contact means on said shafts engaging with the extremities of the axle, conductors embedded in and disposed longitudinally of the shafts for portions of their lengths, screws engaged with said shafts and with the free ends of said conductors imbedded therein and having wing nuts turned into engagement therewith, intelligence transmitting and receiving means, a housing for receiving said transmitting and receiving means, brackets on the opposite ends of the housing engageable with said screws, and having connection with the intelligence transmitting and receiving means in the housing whereby to permit of the conduction of energy to said transmitting and receiving means, the ground contact rod pivoted to a portion of the housing, circuit make and break means arranged in the housing connected to said intelligence transmitting and receiving means capable of being operated to optionally establish one side of an electrical circuit through said ground contact rod or through the metallic tires on said wheels subsequent to the closing of the circuit make and break means carried thereby, and a manually operable crank detachably engaged with the screw threaded extension on said axle for facilitating the imparting of rotary motion thereto.

EDGAR R. SAGER.